April 19, 1960 J. W. WABER 2,933,118
PNEUMATIC TIRE
Filed Nov. 12, 1957
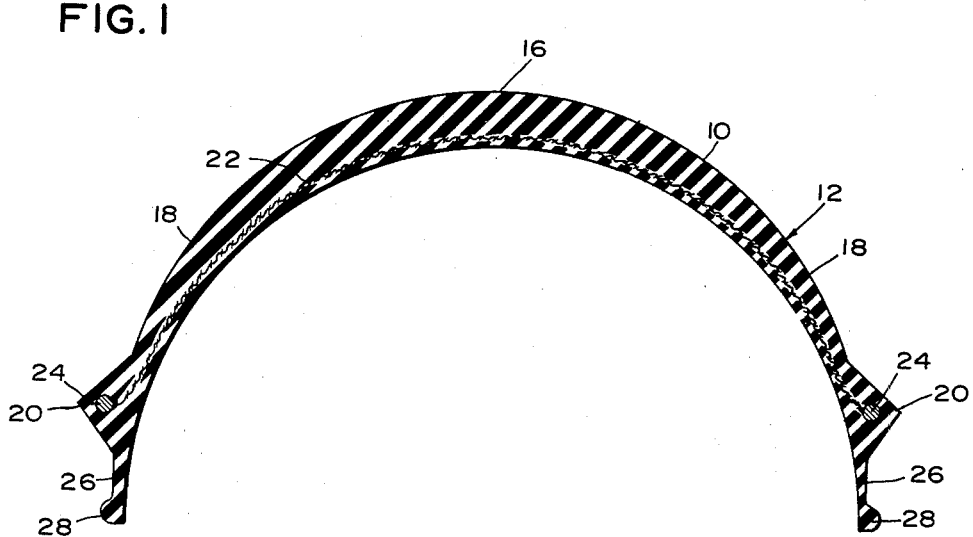
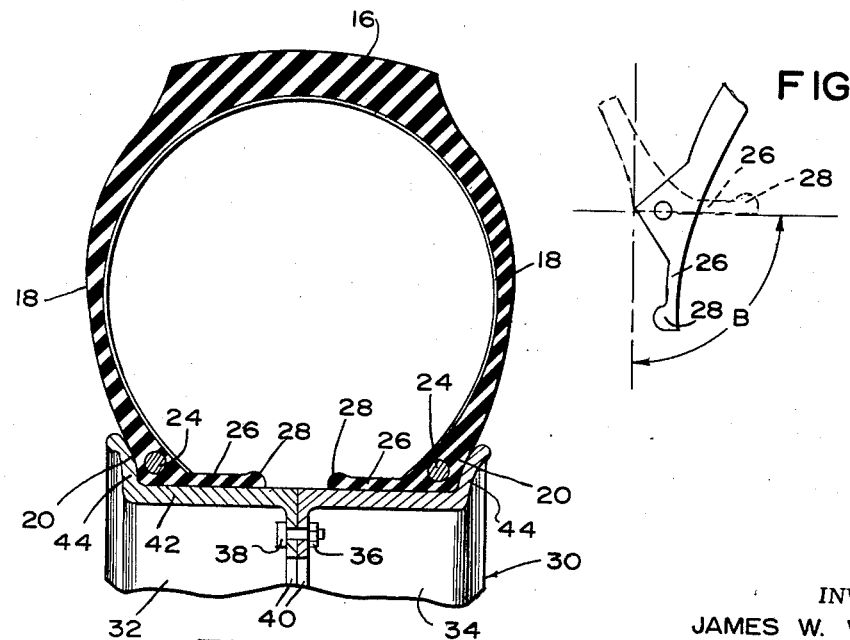
INVENTOR.
JAMES W. WABER
BY
Raymond W Cotton
ATTORNEY

2,933,118
PNEUMATIC TIRE

James Warren Waber, Knoxville, Iowa

Application November 12, 1957, Serial No. 695,640

6 Claims. (Cl. 152—362)

This invention relates to a pneumatic tire and is particularly directed to so-called tubeless tires.

Tubeless tires have been quite desirable for use with bicycles, automobiles, trucks and aircraft because of the need to avoid undue heating. However, such installations of tubeless tires have been attended by excessive leakage of air where the tires contact the rims and particularly when the rims become bent or otherwise damaged.

It is among the objects of the present invention to provide a pneumatic tire which may be used without a tube for truck and aircraft installations, among others, wherein flaps extending from the beads of the tire are stretched during assembly on a rim in such a way that the elasticity of these flaps supplements the pressure effects of the air with which the tire is filled to produce a very effective seal.

A vulcanized pneumatic tire in accordance with the present invention comprises fabric reinforced body, bead and sidewall portions, and a vulcanized elastic annular flap integral with and depending from each of the bead portions, each portion of each flap having an unstretched diameter less than that of its bead portion. Each flap is preferably provided with an enlarged portion remote from its bead portion which may be at its terminus.

In its combination with a rim having a web and flanges, the vulcanized pneumatic tire contemplated herein is assembled on the rim, the tire having a longitudinal axis of revolution and comprising fabric reinforced body, bead and sidewall portions, and a vulcanized elastic stretchable annular flap integral with each of the bead portions stretched into a position engaging the web, each of the flaps having an unstretched position prior to assembly on the rim disposed at an angle exceeding 45° relative to its position of engagement with the web. As a matter of fact, this angle preferably exceeds 75° and in a preferred form of the invention assumes substantially a right angle.

A more complete understanding of the invention will follow from a description of the accompanying drawing wherein:

Fig. 1 is an elevation, partially in section, depicting a tire in accordance with the present invention;

Fig. 2 is a sectional elevation of a tire embodying the present invention mounted on a rim; and Fig. 3 is a diagrammatic representation depicting positions assumed by the bead portions and flaps of a tire embodying the invention.

As depicted in Fig. 1, a tire 12 of any conventional composition is provided with a body portion 16 including at 10 a tread portion, sidewall portions 18 and bead portions 20. Throughout these portions, the tire is provided with an appropriate number of layers of reinforcing fabric 22 in accordance with conventional practice.

Each of the bead portions receives a wire or cable reinforcing element 24 as has become common in the industry.

Depending from each of the bead portions and integral therewith are flaps 26, composed of natural and/or synthetic rubber compositions, which contain no reinforcing fabric and which are therefore elastic and stretchable after vulcanization. Each of the flaps 26 is shown as terminating in an enlargement 28 whose thickness and composition will govern its stretching characteristics.

In Fig. 2 such a tire is depicted as mounted on a rim 30 composed, for example, of two sections 32 and 34 medially secured by nuts 36 and bolts 38 clamping their inturned flanges 40. It will be understood of course, that any conventional types of rims can be substituted for that shown in the drawing, such as drop center rims, flat base rims having separable side rings, and many others. In any case, the rim defines a web 42 and outwardly directed flanges 44 to retain the bead portions 20 in position against separation when the tire is inflated. As clearly depicted in Fig. 2, the enlargements at the proximate edges of the flaps 26 will preferably become deformed sufficiently to permit contact between the flaps and the web of the rim throughout their coextensive areas. It will also be noted by comparing Figs. 1 and 2 that the flaps have been turned through angles of approximately 90° in order to mount the tire on the rim and in this way, the elasticity of the flaps themselves produces a very effective sealing force to supplement that caused by the pressure of the air under inflated conditions urging the flaps towards the web of the rim.

This relationship has been depicted diagrammatically in Fig. 3 wherein the angle of displacement B is shown as having a value of approximately 90°. It has been found that, in general, the greater this angle, the more effective will be the result. In many cases this angle will be at least 45° and a value in excess of 75° will produce very effective results.

Inasmuch as the flaps originally assume a position such as that depicted in Fig. 1 wherein each portion has a diameter less than that of its bead portion, it will follow that each such portion will be stressed in its assembled position on the rim so that this mechanical sealing effect will exist to some degree throughout each flap.

The thickness of the intermediate portions of each flap, is preferable less than that of the sidewalls, as clearly shown in the drawing, to facilitate stretching and mounting on a rim.

Whereas only one specific form of the invention has been shown and described, the invention should not be so limited beyond the scope of the appended claims.

I claim:

1. A vulcanized pneumatic tire comprising fabric reinforced body, bead and sidewall portions, and a vulcanized elastic stretchable annular flap integral with and depending from each of said bead portions, each portion of each flap having an unstretched diameter less than that of its bead portion and each flap having a rim engaging surface having an unstretched position disposed at an angle exceeding 45° but less than 180° with respect to a surface of revolution including said bead portions, and a stretched position for engaging a rim surface disposed at an angle substantially coincident with said surface of revolution.

2. A vulcanized pneumatic tire as set forth in claim 1 wherein each flap is provided with an enlarged portion remote from its bead portion for engagement with a rim surface.

3. A vulcanized pneumatic tire as set forth in claim 1 wherein each flap terminates in an enlarged portion for engagement with a rim surface.

4. In combination with a rim having a web and flanges, a vulcanized pneumatic tire assembled on said rim, said tire having a longitudinal axis of revolution and comprising fabric reinforced body, bead and sidewall portions, and a vulcanized elastic stretchable annular flap integral with each of said bead portions stretched into a position engaging said web, each of said flaps having an unstretched position prior to assembly on said rim disposed at an angle exceeding 45° radially inwardly relative to its position of engagement with said web.

5. The invention as set forth in claim 4 wherein said angle exceeds 75°.

6. The invention as set forth in claim 4 wherein said angle is substantially a right angle.

References Cited in the file of this patent

UNITED STATES PATENTS

| | | |
|---|---|---|
| 2,583,809 | Bloechl | Jan. 29, 1952 |
| 2,754,876 | King | July 17, 1956 |
| 2,822,021 | Shipman et al. | Feb. 4, 1958 |

FOREIGN PATENTS

| | | |
|---|---|---|
| 15,430 | Great Britain | of 1899 |
| 533,052 | Great Britain | Feb. 5, 1941 |
| 514,764 | Canada | July 19, 1955 |